United States Patent
Ohrem et al.

(10) Patent No.: US 6,824,702 B1
(45) Date of Patent: Nov. 30, 2004

(54) DEVICE AND METHOD FOR PRODUCING MOLTEN SALTS AND USE THEREOF

(75) Inventors: Hans Leonhard Ohrem, Jugenheim (DE); Susanne Brzezinski, Einhausen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/937,011

(22) PCT Filed: Mar. 8, 2000

(86) PCT No.: PCT/EP00/02009

§ 371 (c)(1),
(2), (4) Date: Sep. 20, 2001

(87) PCT Pub. No.: WO00/56659

PCT Pub. Date: Sep. 28, 2000

(30) Foreign Application Priority Data

Mar. 24, 1999 (DE) .......................... 199 13 190

(51) Int. Cl.⁷ .............. C09K 5/00; C21B 7/00; C22B 1/00; H01M 4/36; C23F 13/00
(52) U.S. Cl. .................. 252/68; 252/71; 266/171; 266/233; 423/116; 423/472; 429/103; 204/196.07; 204/199.1
(58) Field of Search ............... 252/68, 71; 266/171, 266/233; 423/116, 472; 429/103; 204/196.07, 199.1

(56) References Cited

U.S. PATENT DOCUMENTS 3,761,578 A     9/1973  Anderson ................ 423/463
4,117,207 A  *  9/1978  Nardi et al. ............. 429/103

FOREIGN PATENT DOCUMENTS

DE     3718920 A     12/1987
FR     2168912 A      9/1973

* cited by examiner

Primary Examiner—Hoa Van Le
(74) Attorney, Agent, or Firm—Millen, White, Zelano, Branigan, P.C.

(57) ABSTRACT

The invention relates to an apparatus and a process for the preparation of salt melts, and mixtures thereof, by means of a stirred reactor and a tubular reactor, in which the starting materials are melted and brought to reaction, and the reaction products are subsequently passed through columns or towers for purification.

8 Claims, 1 Drawing Sheet

DEVICE AND METHOD FOR PRODUCING MOLTEN SALTS AND USE THEREOF

Figure 1:
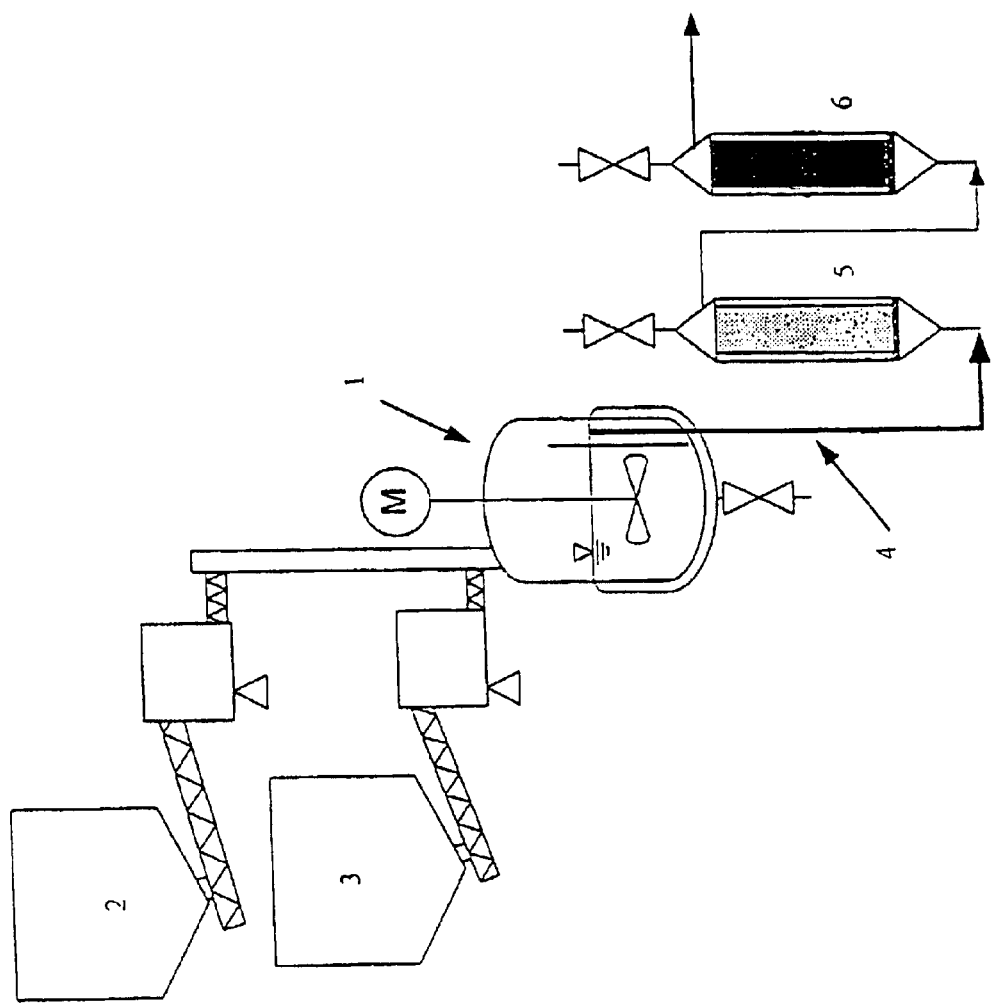

The invention relates to an apparatus and a process for the preparation of salt melts and mixtures thereof by means of a tubular reactor and a continuous stirred reactor, in which the starting materials are melted and brought to reaction, and the reaction products are subsequently passed through columns for purification.

Melts of salts, such as, for example, $NaAlCl_4$, have various areas of application. Salt melts can be employed as storage medium in heat stores, as heat-transfer agents, for example in heating baths, for blanketing and purifying molten metals, for electrocoating of high-melting materials or as melt electrolyte in primary batteries, as described in CB 2,046,506. A further possible application of these salts is in rechargeable sodium batteries. The salts are employed in batteries which have operating temperatures of between 130° C. and 200° C. (K. M. Abraham, D. M. Pasquarielio, J. Electrochem. Soc., Vol. 137, 1189–1190 (1990)).

DE 3419279 describes an electrochemical cell in which the cathode matrix is impregnated with a sodium/aluminium halide salt melt electrolyte.

A relatively new area of application is the "ZEBRA battery". This high-temperature cell consists of an electrode of liquid sodium, a beta-aluminium electrolyte and an electrode of transition-metal chloride in an $NaAlCl_4$ melt (B. Cleaver, V. S. Sharivker, J. Electrochem. Soc., Vol. 142, 3409–3413 (1995)).

DE 3718920 describes the preparation of salt melts by adding a pure metal and an alkali metal halide to the melt. The reaction cell is operated above the melting point of the salt melt. In the working example, the alkali metal halide is NaCl, the molten alkali metal Is sodium, and the separator is beta-aluminium oxide. Owing to the use of pure sodium, special safety precautions, such as working under a protective-gas atmosphere, must be taken. The reactions must take place in separate cells, since poisoning of the separator by the by-product $AlHal_3$ formed must be prevented.

All the processes disclosed hitherto for the preparation of salt melts operate batchwise. A batch procedure has some severe disadvantages compared with a continuous preparation process. During a batch change, the apparatus must be opened. The product can then be contaminated by the oxygen from the ambient air, water and dust. The batch change results in down times of the plant and thus in a reduced space-time yield. An effective discontinuous process requires large apparatuses. The start-up process requires correspondingly more energy and time. It is been found that, in particular during start-up of the plants, impurities can be introduced into the process. FR 2168912 describes a complex purification process for alkali metal halogen aluminates. The 2-step purification process consists of oxygen treatment for degrading the organic impurities and aluminium treatment for precipitating iron and heavy metals. The aluminium treatment must be carried out under a nitrogen or argon atmosphere.

For the preparation of the alkali metal halogen aluminates, the reaction of corresponding aluminium halides and alkali metal halides in a sealed tube is described (Friedman, Taube, J. Am. Chem. Soc., 72, 2236–2243 (1950)). In this process, an increase in pressure to 6–7 atmospheres is observed, which results in problems (FR 2168912). The apparatuses must be fitted with the appropriate safety precautions.

For continuous processing of the salts, basically tubular reactors and continuous stirred reactors are suitable.

Tubular reactors are ideal reactors for the continuous processing of liquid media. The residence-time distribution here is very narrow, which means that all particles have approximately the same residence time, and a very narrow quality distribution is thus produced. A high surface area/volume ratio and turbulent flow mean that a tubular reactor is highly suitable for heat transfer. For use for a solid, however, the prerequisite of flowability is lacking. In addition, heat transfer for melting a salt mixture is very poor owing to the poor thermal conduction of the granular starting materials, which results in very long residence times.

Another possibility for carrying out reactions continuously is the continuous stirred reactor. Here, the granulated starting materials can be metered into the stirred melt. This facilitates convective heat transfer, which considerably accelerates heating of the starting materials. In particular if subliming salts are to be used as starting materials, a temperature below the sublimation temperature is necessary in order to avoid an excess pressure in the system. A severe disadvantage of the continuous stirred reactor is the residence-time distribution. This results in a significant proportion of unreacted starting materials always being present in the product discharge stream.

The object of the invention is to provide a continuous process for the preparation of pure salt melts which excludes the disadvantageous effects of the environment, minimizes the energy requirement and facilitates an optimum space-time yield. A further object is to make large amounts of salt melts available in the shortest possible time.

The object according to the invention is achieved by an apparatus for the preparation of salt melts, and mixtures thereof, of the general formula $$MDX_4 \qquad (I)$$

in which
M is Li, Na, K, Rb or Cs,
D is Al, Ga, in or Tl, and
X is F, Cl, Br or I,
essentially consisting of a heatable stirred reactor (1) and a downstream tubular reactor (4), where the stirred reactor (1) contains a zone which, owing to the tank geometry, cannot contain solids, and the tubular reactor (4) or its feed line extends into this solid-free zone.

The invention furthermore relates to a process for the preparation of salt melts, and mixtures thereof, of the general formula (I) by reacting a metal halide of the formula $DX_3$ (II) with an alkali metal salt of the formula MX (III) in the abovementioned apparatus.

The process products are suitable for use as melt electrolyte in electrochemical cells, as storage medium in heat stores, as heat-transfer agent, for example in heating baths, for blanketing and purifying molten metals, for electrocoating of high-melting materials or as melt electrolyte in rechargeable sodium batteries and primary batteries.

Surprisingly, it has been found that a suitable combination of a continuous stirred reactor and a plurality of tubular reactors allows a salt melt of the desired quality to be produced continuously.

The process can be carried out using all continuous and heatable stirred reactors which appear suitable to the person skilled in the art. For the task of stirring, use can be made of all suitable stirrers, such as propeller, inclined blade, disc, impeller, cross-blade, gate or blade stirrers. The stirrer should facilitate good heat transfer between the reactor wall and the salt or melt.

Stirred reactors are usually made of steel. The aggressive salt melts can attack this material in a corrosive manner.

It has been found that stirred reactors whose main components are made of nickel alloys are particularly suitable for the processing of salts and salt melts. The relatively low mechanical stress on the reactor shell means that nickel can also be used as the tank material. It is also possible to employ reactors made of class. It has furthermore been found that the metal parts of the stirred reactor which come into contact with the salts or salt melts can be protected against corrosive and abrasive damage by surface coatings with materials known to the person skilled in the art, such as PTFE/PFA, enamel or ceramic materials.

In order to improve the efficiency of the stirred reactor, it is necessary that no solid enters the reactor overflow. Surprisingly, it has been found that this object can be achieved by means of a settling zone in the reactor. This settling zone is designed in such a way that it has a feed line for the mixture from below and is sufficiently large What the solid in the inflowing mixture can settle out.

Similar demands are made of the material of the downstream heatable tubular reactor as are made of the stirred reactor, Besides steel, nickel and nickel alloys, steel reactors coated with PTFE/PFA, enamel or ceramic materials are also suitable.

An essential advantage is the combination of stirred reactor with tubular reactor. A higher temperature can be set in the downstream tubular reactor. This results in undissolved alkali metal salt dissolving and reacting in the melt at the higher temperatures in a finite residence time.

The reaction in the stirred reactor and tubular reactor can be carried out in the presence of atmospheric oxygen or optionally under a protective-gas atmosphere (for example nitrogen, $CO_2$, noble gases) under reduced pressure, atmospheric pressure or ever, under superatmospheric pressure, at temperatures of from 50° C. to 800° C. (under atmospheric pressure). When working under superatmospheric pressure or reduced pressure, the melting points of the salts shift correspondingly.

The processing should be carried out at below the sublimation temperature of the starting materials. Preference is given to higher temperatures, since the solubility of the salts is significantly better under such conditions.

During the processing of the salts in the stirred reactor and in the tubular reactor, an optimum temperature programmed can be set during the process by means of heater bands or twin-jacket heating.

The process can be carried out continuously or discontinuously, as required.

In order to carry out the process, the metal halide employed is aluminium, gallium, indium or thallium fluoride, chloride, bromide or iodide, or mixtures thereof. Suitable alkali metal salts are lithium, sodium, potassium, rubidium or caesium fluoride, chloride, bromide or iodide, or mixtures thereof.

A general example of the invention is explained in greater detail below and is shown in the drawing.

FIG. 1 shows a stirred reactor 1 with solids metering devices 2 and 3, a tubular reactor 4, and downstream columns or towers 5 and 6.

In order to prepare salts conforming to the formula (I), and mixtures thereof, the starting materials can be fed to the reactor separately via solids metering devices (2) and (3). The starting materials can also be fed in, premixed, in the same ratio via a single metering device. The filling can also be carried out under an inert gas.

The heatable stirred reactor (1) with stirrer contains a liquid salt melt. The volume of this melt is determined depending on the required residence time and the desired throughput. The materials are reacted in the stirred reactor at temperatures above the melting point of the salt and below the sublimation temperature of the respective metal halide.

The fill level of the reactor is kept constant by means of an overflow pipe or an electrically controlled pump. In order that no solid starting material enters the overflow, the reactor contains a settling zone which has a feed line for the mixture from below and is sufficiently large that the solid can settle out in the outflowing mixture. This zone does not have a feed from the liquid surface and is sufficiently screened from the turbulence of the stirrer. Alternatively, use can be made of a rotating drum from whose centre the product is discharged and whose centrifugal force separates off the solid. A hydrocyclone is also suitable for this task if an adequate flow rate is generated via a pump.

In order to increase the efficiency, a tubular reactor (4) is connected downstream of the stirred reactor.

The temperatures in the tubular reactor can be higher than in the stirred reactor. This enables undissolved alkali metal salt to be dissolved in the melt and the yield to be increased.

The tubular reactor is advantageously arranged vertically. This prevents deposition of the solid on the vessel wall. In addition, pumps are unnecessary since material transport takes place via gravity.

The melt may have been be contaminated by contact with water or atmospheric moisture. The hydrogen halide formed is passed through a column or tower (5) filled with the appropriate metal granules. The melt advantageously passes through the column or tower from bottom to top. The hydrogen halide reacts with the metal to form $DX_3$. For further processing, the metal halide is passed through a further column or tower (6). The flow through the column or tower charged with alkali metal salt MX is likewise from bottom to top. The metal halide $DX_3$ is reacted with the alkali metal salt MX here to form the desired salt $MDX_4$.

It is not vital that the flow through the columns or towers (5) and (6) is from bottom to top, but this does have the advantage that the metal particles D and metal halide particles $DX_3$, which are becoming smaller owing to the reaction, are not forced against the screen plate by the flow and block the latter. Nevertheless, homogeneous flow (plug flow) in the column is ensured in this way. Homogeneous flow is an essential prerequisite for complete reaction in the column.

The example given below is given in order to better illustrate the present invention, but is not suitable for restricting the invention to the features disclosed therein.

EXAMPLES

Example 1

Preparation of $NaAlCl_4$

In order to prepare 1 kg/h of $NaAlCl_4$, 373.8 g/h of NaCl are fed to a heatable stirred reactor via a solids metering device and 626.2 g/h of $AlCl_3$ are fed to the reactor via a further solids metering device. The glass stirred reactor w-th propeller stirrer and oil-heated twin jacket contains a volume of liquid salt melt at a temperature which is below the sublimation temperature of the $AlCl_3$ (180° C.), but above the meting point of the salt (156° C.). Vigorous stirring causes intimate contact between the liquid melt and the heated reactor wall on one hand and the cold starting material on the other hand. This results in good heat transfer, and consequently the average residence time is about 5 minutes.

The fill level of the reactor is kept constant by means of an overflow pipe. Contamination of the products by unreacted starting materials is excluded here by the connection downstream of a tubular reactor (4). Due to the setting of elevated temperatures in the tubular reactor, here 200° C., undissolved NaCl can react in the melt. The vertically arranged tubular reactor prevents the deposition of the solid which remains. In addition, pumps are unnecessary since material transport takes place via gravity.

The melt possibly contaminated by water can form hydrogen halide. Th is can be removed by reaction in two downstream columns filled with aluminium granules (5) and with NaCl (6). In the columns, through which flow is from bottom to top, firstly the hydrogen halide can react with aluminum to give $AlCl_3$ and subsequently in the second column with the salt NaCl to give the product $NaAlCl_4$.

What is claimed is:

1. Apparatus for the preparation of salt melts, and mixtures thereof, of the formula $$MDX_4 \quad (I)$$

in which
M is Li, Na, K, Rb or Cs,
D is Al, Ga, In or Tl, and
X is F, Cl, Br or I,
comprising a heatable stirred reactor (1) and a downstream tubular reactor (4), wherein the stirred reactor (1) contains a zone which, owing to the tank geometry, cannot contain solids, and the tubular reactor (4) or its feed line extends into this solid free zone.

2. Apparatus according to claim 1, wherein the tubular reactor (4) is arranged vertically.

3. Apparatus according to claim 1, wherein solids metering units (2, 3) for controlled addition of mixing of the starting materials are arranged upstream of the stirred reactor (1).

4. Apparatus according to claim 1, wherein a purification unit (5, 6), comprising a column or tower (5) filled with metal granules (d) and a column or tower filled with alkali metal salt (MX), is arranged downstream of the tubular reactor (4).

5. Process for the preparation of salt melts of the formula (I):

$$MDX_4 \quad (I)$$

in which
M is Li, Na, K, Rb or Cs,
D is Al, Ga, In or Tl, and
X is F, Cl, Br or I,
by reacting a metal halide of the formula $DX_3$ (II) with an alkali metal salt of the formula MX (III), wherein the reaction is carried out in an apparatus according to claim 1, where the reaction is carried out firstly in a stirred reactor (1) and subsequently in a tubular reactor (4).

6. Process according to claim 5, wherein the salts are reacted at different temperatures in the stirred reactor (1) and the tubular reactor (4).

7. Process according to claim 5, wherein the salts are reacted at temperatures between 50 and 800° C.

8. Process according to claim 5, wherein the reaction is carried out continuously.

* * * * *